(12) United States Patent
Morgan et al.

(10) Patent No.: US 11,721,968 B2
(45) Date of Patent: Aug. 8, 2023

(54) CONDUIT CAP

(71) Applicant: East Coast Lightning Equipment Inc., Winsted, CT (US)

(72) Inventors: Mark P. Morgan, Norfolk, CT (US); Baylen Smith, Ball Ground, GA (US); Philip J. Blouin, Torrington, CT (US)

(73) Assignee: East Coast Lightning Equipment Inc., Winsted, CT (US)

( * ) Notice: Subject to any disclaimer, the term of this patent is extended or adjusted under 35 U.S.C. 154(b) by 0 days.

(21) Appl. No.: 17/514,695

(22) Filed: Oct. 29, 2021

(65) Prior Publication Data

US 2022/0140591 A1    May 5, 2022

Related U.S. Application Data

(60) Provisional application No. 63/107,045, filed on Oct. 29, 2020.

(51) Int. Cl.
*H02G 15/04* (2006.01)

(52) U.S. Cl.
CPC ................. *H02G 15/046* (2013.01)

(58) Field of Classification Search
CPC ... H01R 3/06; H01R 4/24; H01R 4/28; H01R 4/40; H01R 4/42; H01R 4/34; H01R 4/36; H01R 4/64; H01R 4/66; H01R 4/643; H01R 11/26; H01R 11/15; H01R 11/281; H01R 11/283; H01R 11/282; H01R 11/286; H01R 13/53; H01R 13/655; H01R 13/621; H01R 13/648; H01R 43/26; F16B 2/06; H02G 7/00; H02G 7/05; H02G 7/20; H02G 7/22; H02G 13/80; H02G 15/046; H02G 15/04

USPC ......... 439/14 R, 14 L, 100, 208, 251, 272 R, 439/756, 762, 764, 767, 769; 174/51, 174/74 R, 78, 86; 248/229.1, 229.14, 248/229.15, 229.2, 229.24, 229.25, 248/226.12, 230.5, 230.6, 231.61, 231.71

See application file for complete search history.

(56) References Cited

U.S. PATENT DOCUMENTS

| | | | | |
|---|---|---|---|---|
| 1,418,370 A | * | 6/1922 | Fitz ...................... | H02G 3/0418 174/101 |
| 3,967,872 A | * | 7/1976 | Mooney ................... | H01R 4/64 439/100 |
| 4,248,490 A | * | 2/1981 | Bachle ..................... | H01R 4/64 439/810 |

(Continued)

FOREIGN PATENT DOCUMENTS

| | | | | |
|---|---|---|---|---|
| KR | 10-0982047 B1 | * | 9/2010 | ............... H02G 7/02 |

*Primary Examiner* — William H. Mayo, III
(74) *Attorney, Agent, or Firm* — Alix, Yale & Ristas, LLP

(57) ABSTRACT

The conduit cap includes a cap, an outer clamp member, and a bolt. The cap defines a central first threaded axial blind opening and has a top and an interior cylindrical rim coaxial with the central threaded opening and has an outer clamp defining a transverse second threaded opening and has two outwardly projecting angularly spaced shoulders. The outer clamp member defines a third opening alignable with the transverse second opening and a pair of parallel recesses. The outer clamp member has two pairs of opposed wings. Each pair of wings at least defining a recess dimensioned to receive a shoulder. The bolt is insertable though the third opening and threadably engageable in the transverse opening to clamp the outer clamp member to the first clamp.

14 Claims, 5 Drawing Sheets

(56) References Cited

U.S. PATENT DOCUMENTS

| | | | | |
|---|---|---|---|---|
| 5,480,311 | A * | 1/1996 | Luu | H01R 4/643 |
| | | | | 439/208 |
| 9,083,092 | B2 * | 7/2015 | Renton | H01R 4/40 |
| 9,257,795 | B2 * | 2/2016 | Smith | H01R 13/655 |
| 2017/0358872 | A1 * | 12/2017 | Trombley | H01R 4/2408 |
| 2019/0148847 | A1 * | 5/2019 | Martin | H01R 4/64 |
| | | | | 439/92 |

* cited by examiner

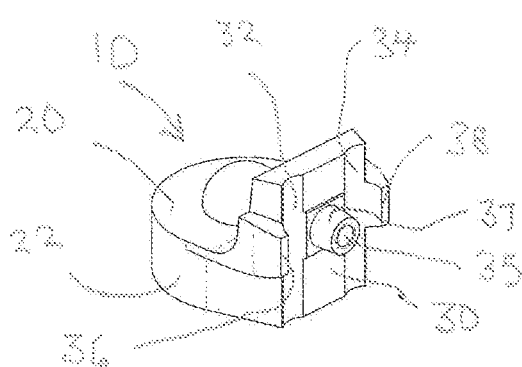
Figure 13
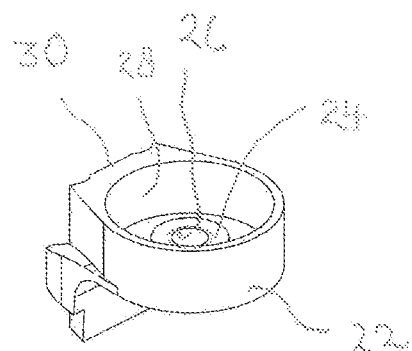
Figure 14
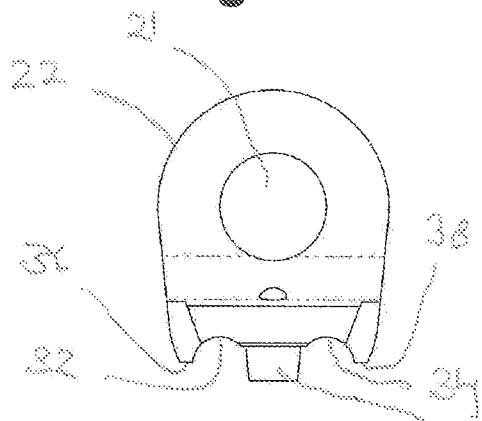
Figure 15
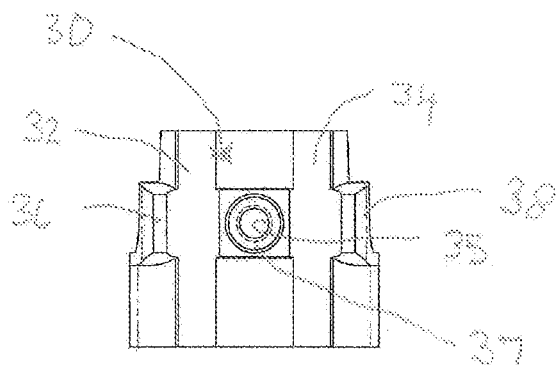
Figure 16
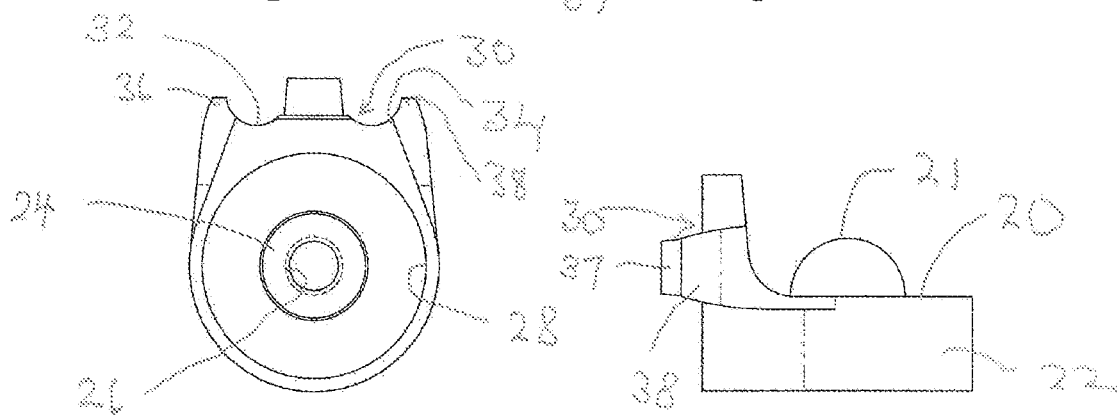
Figure 17
Figure 18
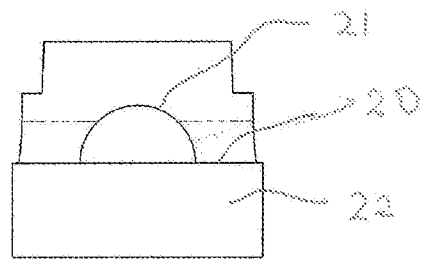
Figure 19

CONDUIT CAP

CROSS-REFERENCE TO RELATED APPLICATION

This application claims priority to U.S. Provisional Patent Application No. 63/107,045, filed Oct. 29, 2020, the entire contents of which are incorporated herein.

BACKGROUND

This disclosure relates generally to apparatus for securing an electrical cable. More particularly, this disclosure relates to roof mounted apparatus for securing a cable employed in lightning protection systems.

SUMMARY

In accordance with one or more exemplary embodiments of the disclosure, a conduit cap is disclosed. The conduit cap includes a cap, an outer clamp member, and a bolt. The cap defines a central first threaded axial blind opening and has a top and an interior cylindrical rim coaxial with the central threaded opening and has an outer clamp defining a transverse second threaded opening and has two outwardly projecting angularly spaced shoulders. The outer clamp member defines a third opening alignable with the transverse second opening and a pair of parallel recesses. The outer clamp member has two pairs of opposed wings. Each pair of wings at least defining a recess dimensioned to receive a shoulder. The bolt is insertable though the third opening and threadably engageable in the transverse opening to clamp the outer clamp member to the first clamp.

BRIEF DESCRIPTION OF THE DRAWINGS

FIG. 13 is a perspective view of the conduit cap of FIG. 1;

FIG. 14 is a bottom perspective view of the conduit cap of FIG. 13;

FIG. 15 is a top plan view of the conduit cap of FIG. 13;

FIG. 16 is a front elevational view of the conduit cap of FIG. 13;

FIG. 17 is a bottom plan view of the conduit cap of FIG. 13;

FIG. 18 is a side elevational view of the conduit cap of FIG. 13; and

FIG. 19 is a rear view of the conduit cap of FIG. 13.

DETAILED DESCRIPTION

Figure 1:
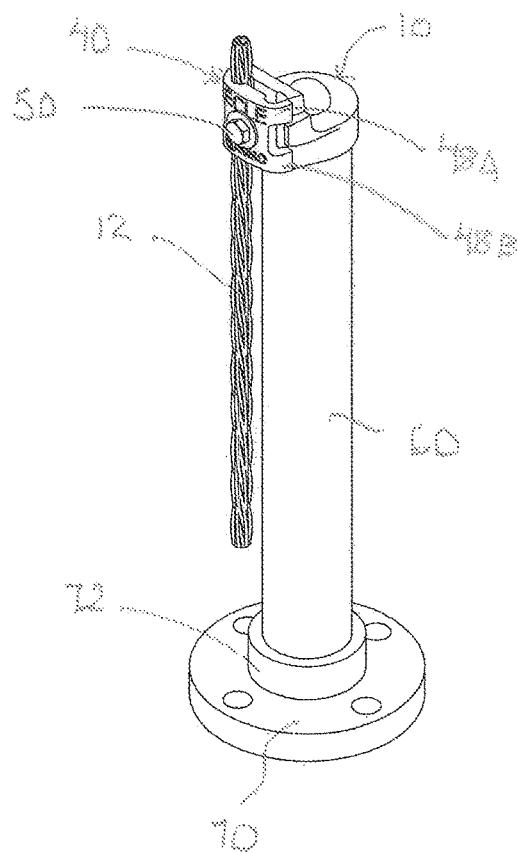
FIG. 1 is a perspective view of a roof mounted installation which employs a conduit cap to secure a cable in a first orientation.
Figure 2:
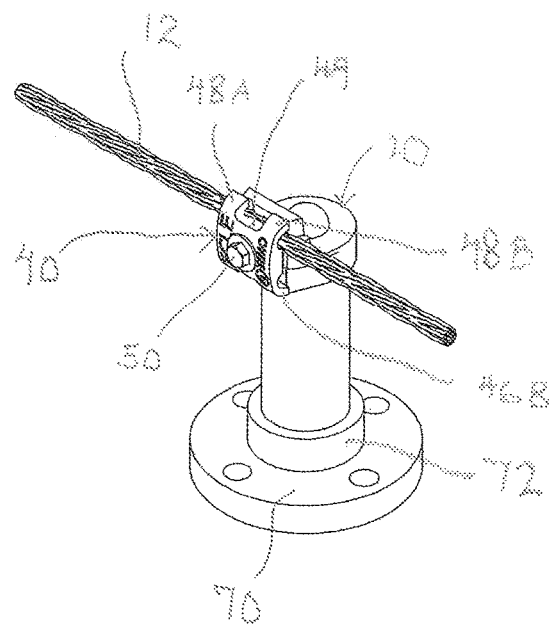
FIG. 2 is a perspective view of a second roof mounted installation which employs a conduit cap to secure a cable in a second orientation.

With reference to the drawings, wherein like numerals represent like parts throughout the views, a conduit cap is generally designated by the numeral 10. The conduit cap is employed in conjunction with a clamp member to secure a cable for a roof mounted installation. The conduit cap 10 has particular applicability in conjunction with securing a cable 12 for a lightning protection system. the conduit cap 10 is adaptable to secure the cable in a selected vertical (FIG. 1) or horizontal position (FIG. 2). The conduit cap 10 functions to provide a roof mounting system which has a watertight seal.

The conduit cap 10 is preferably a metal cast member which has a generally cylindrical form with a top surface 20 and cylindrical outer surface 22 interrupted by an integral clamp surface 30. A central boss 24 projects upwardly to form a dome 21 and projects inwardly. The boss 24 forms an axial threaded blind hole 26 which opens inwardly. A shallow cylindrical rim 28 at the interior is coaxial with the blind hole 26.

The clamp surface 30 has a pair of parallel arcuate recesses 32 and 34 which extend axially at the cap exterior. A pair of angularly spaced shoulders 36 and 38 project outwardly from the clamp surface. The shoulders 36 and 38 are preferably identical in shape and have tapered upper and lower surfaces. A boss 37 extends outwardly from the clamp surface 30 equidistantly spaced between shoulders 36 and 38. A threaded transversely extending bore 35 is centrally disposed in the boss 37 between the recesses 32, 34 and the shoulders 36, 38. The transverse bore 35 is orthogonal to the axial threaded blind hole (or axial bore) 26.

Figure 3:
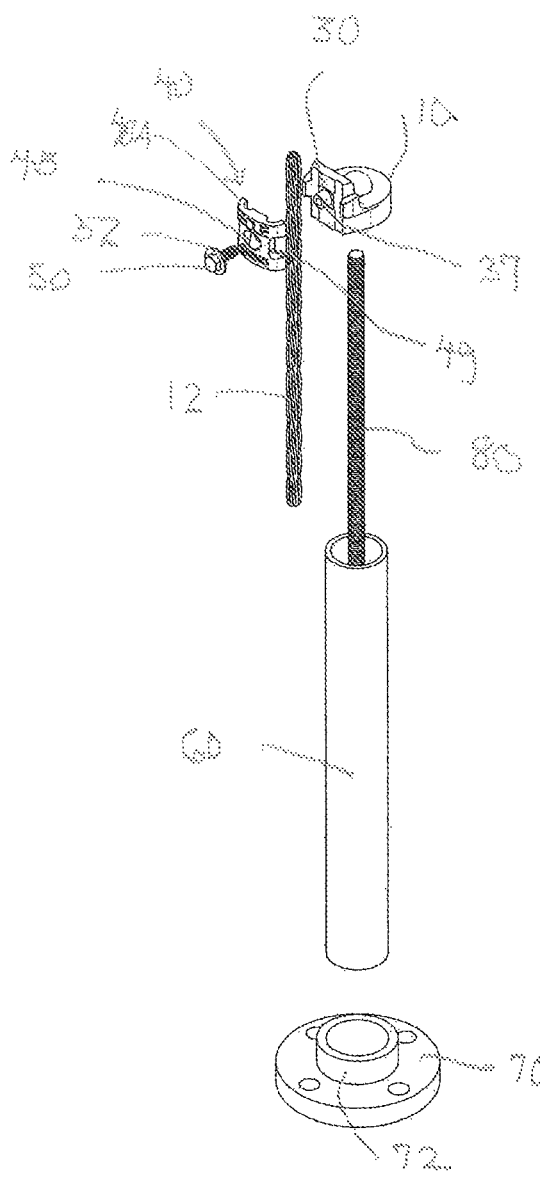
FIG. 3 is an exploded view of the installation of FIG. 1.
Figure 4:
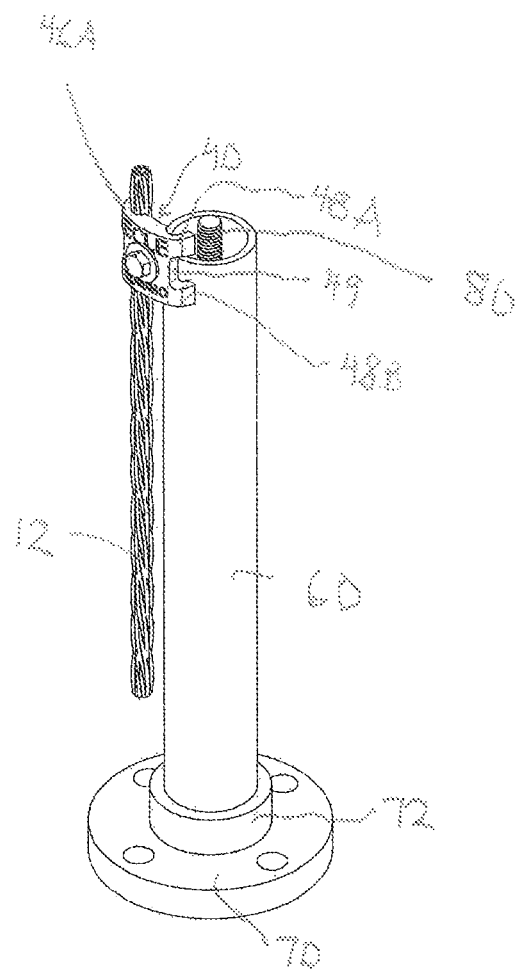
FIG. 4 is a partially exploded view with the conduit cap being omitted.
Figure 5:
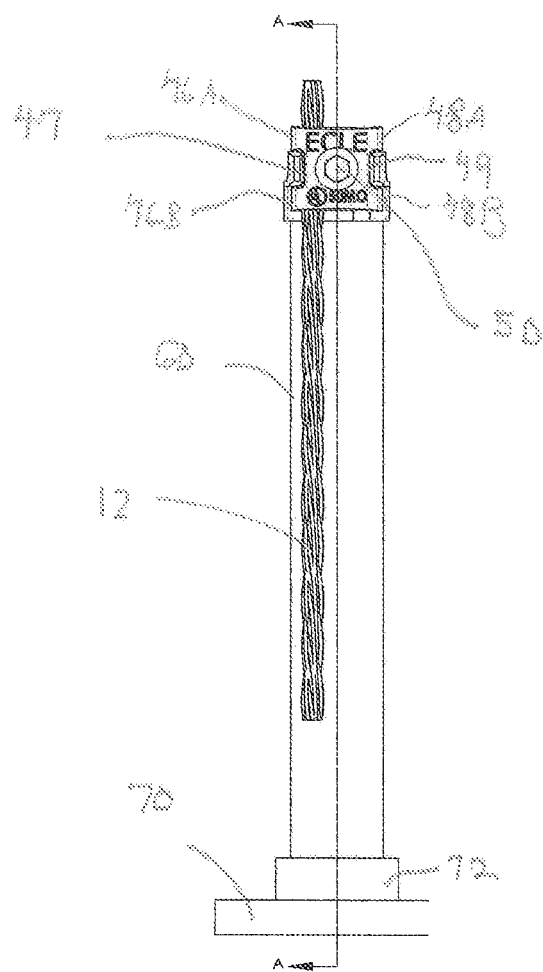
FIG. 5 is a frontal elevational view of the installation of FIG. 1.
Figure 6:
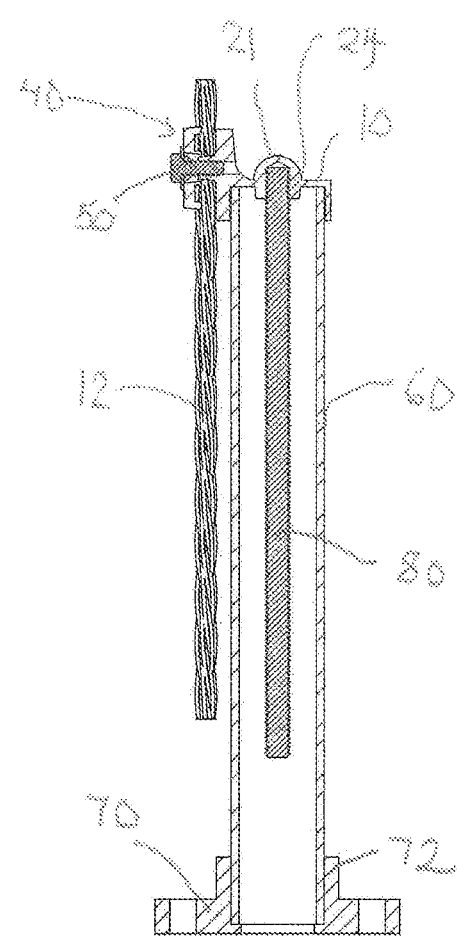
FIG. 6 is a sectional view of the installation of FIG. 5 taken along the lines A-A thereof.
Figure 7:
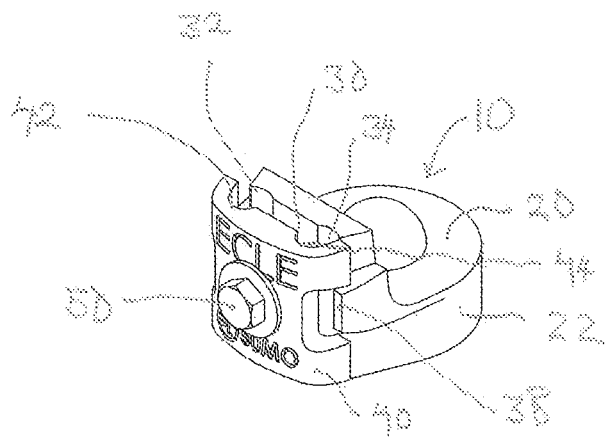
FIG. 7 is an enlarged perspective view of the conduit cap assembly of FIG. 1.
Figure 8:
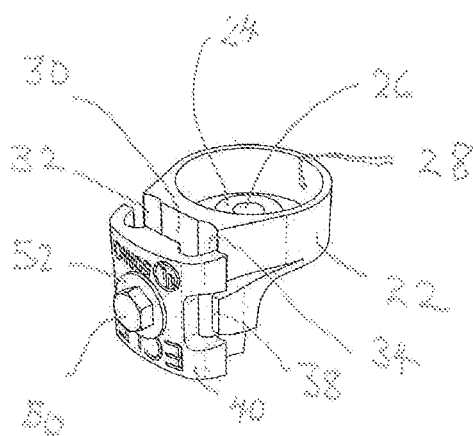
FIG. 8 is a bottom perspective view of the conduit cap assembly of FIG. 7.
Figure 9:
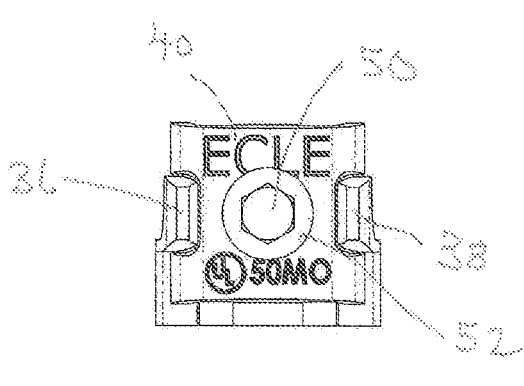
FIG. 9 is a front view of the conduit cap assembly of FIG. 7.
Figure 10:
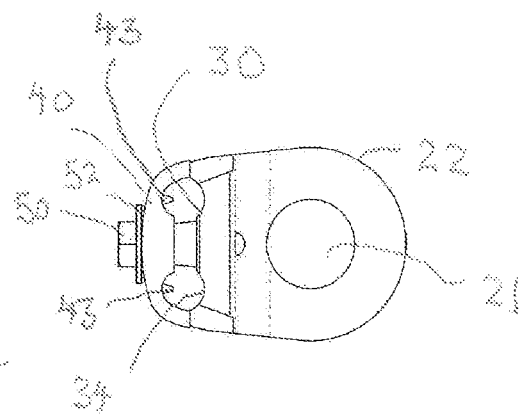
FIG. 10 is a top plan view of the conduit cap assembly of FIG. 7.
Figure 11:
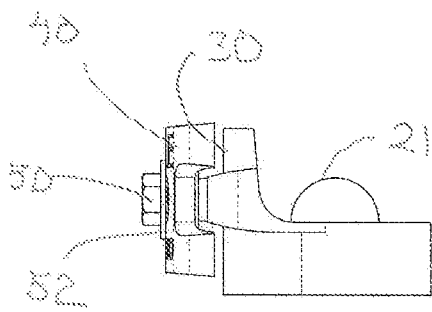
FIG. 11 is a side elevational view of the conduit cap assembly of FIG. 7.
Figure 12:
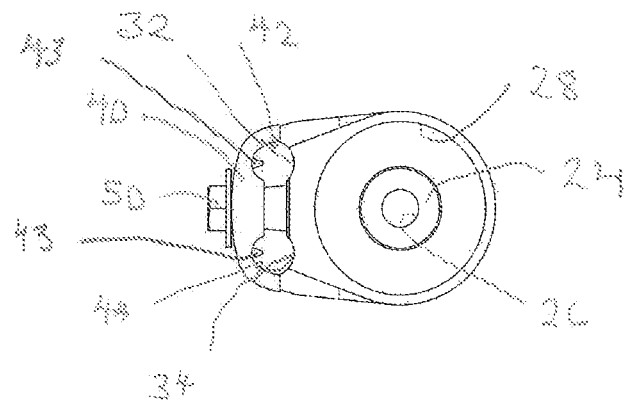
FIG. 12 bottom plan view of the conduit cap assembly of FIG. 7.

A conformal outer clamp member 40 is configured to cooperate with the clamp surface 30 to securely retain a received cable 12. The clamp member 40 has an inner surface traversed by two parallel, shallow arcuate recesses 42 and 44. Barbs 43 (FIGS. 10 and 12) may project into the recesses. A central opening 45 (FIG. 3) is medially disposed between the recesses 42, 44. Two pairs of contoured clawlike wings 46A, 46B and 48A, 48B extend from corner locations of the clamp member 40. A recess 47 is formed between wings 46A and 46B, and an identically shaped recess 49 is formed between wings 48A and 48B. The recesses 47, 49 are dimensioned so that they will receive the shoulders 36, 38 in one clamp orientation, such as illustrated in FIG. 1. The pairs are also spaced a distance which will allow the clamp member to be rotated 90 degrees and cooperatively clamp with clamp surface 30, such as illustrated in FIG. 2.

In the orientation of FIG. 1, a cable 12 is placed between recesses 32 and 42. A hex head bolt 50 with a washer 52 is inserted through opening 45 and tightened in opening 35 to clamp the cable in a vertical orientation. The shoulders 36, 38 are respectively received in recesses 47, 49 and wings 46A and 46B are curved to engage around the side of the clamped cable 12. The cable 12 optionally could be received in recesses 34 and 44 and clamped in place as desired.

In the orientation of FIG. 2, the outer clamp member 40 is rotated 90 degrees and the cable 12 is received in recess 44. The bolt 50 is tightened in the opening 35 to clamp the cable in a horizontal orientation. The wings 48A and 46A and the wings 48B and 46B are spaced so that the wings 46A and 46B are positioned above the cable 12 and the shoulders 36 and 38.

The conduit cap 10 is places over the end of a Schedule 40 1.5 inch PVC conduit 60. The conduit is closely received in the rim 28 and sealed with adhesive sealant. A base 70 having a sleeve 72 is dimensioned to closely receive the other end of the conduit. The base mounts against the top of a flat roof (not illustrated). The conduit 60 and sleeve 72 are bonded together and sealed at their interface by an adhesive sealant.

A threaded rod 80 (only portions illustrated) extends through the roof and upwardly through the conduit 60 and is threadably engaged to the conduit cap 10 by threading into the blind hole 26. A plate (not illustrated) has a threaded opening which threads with a lower end of bolt 80. The plate is torqued to engage against the underside of the roof to secure the conduit 60 and the conduit cap 10 in a sturdy fixed and a sealed relationship to the roof. The cable 12 is then secured the to clamp assembly.

Below are provided further descriptions of various non-limiting, exemplary embodiments. The below-described exemplary embodiments may be practiced in conjunction with one or more other aspects or exemplary embodiments. That is, the exemplary embodiments of the disclosure, such as those described immediately below, may be implemented, practiced or utilized in any combination (e.g., any combination that is suitable, practicable and/or feasible) and are not limited only to those combinations described herein and/or included in the appended claims.

In one exemplary embodiment, a conduit cap comprising: a cap defining a central first threaded axial blind opening and having a top and an interior cylindrical rim coaxial with said central threaded opening and having an outer clamp defining a transverse second threaded opening and having two outwardly projecting angularly spaced shoulders; an outer clamp member defining a third opening alignable with said transverse second opening and a pair of parallel recesses, said outer clamp member having two pairs of opposed wings, each pair of wings at least defining a recess dimensioned to receive a said shoulder; and a bolt insertable though said third opening and threadably engageable in said transverse opening to clamp said outer clamp member to said first clamp.

A conduit cap as above wherein said outer clamp member is rotatable 90° and said bolt is insertable through said thread, said third opening and threadably engageable in said transverse opening to clamp said outer clamp member to said first clamp.

A conduit cap as above wherein said clamp defines a pair of parallel recesses.

A conduit cap as above wherein said outer clamp member defines a pair of parallel recesses.

A conduit cap as above wherein said wings are curved.

A conduit cap as above wherein a boss extends outwardly from said clamp and defines said transverse bore and said boss is at least partially receivable by said outer clamp member.

A conduit cap as above wherein said cap has an interior boss which defines said central axial threaded opening.

A conduit cap as above wherein said conduit cap is a metal cast member.

It should be understood that components of the various exemplary embodiments can be operationally coupled or connected and that any number or combination of intervening elements can exist (including no intervening elements). The connections can be direct or indirect and additionally there can merely be a functional relationship between components.

It should be understood that the foregoing description is only illustrative of the various exemplary embodiments. Various alternatives and modifications can be devised by those skilled in the art without departing from the disclosure. Accordingly, the various exemplary embodiments are intended to embrace all such alternatives, modifications and variances which fall within the scope of the appended claims.

The invention claimed is:

1. A conduit cap comprising:
    a cap defining an axial blind first threaded opening and having a top surface and an interior cylindrical rim coaxial with said first threaded opening and having a radially outward facing clamp surface defining a second threaded opening transverse to said first threaded opening and having two outwardly projecting angularly spaced shoulders;
    an outer clamp member defining a third opening alignable with said second threaded opening and a pair of parallel clamp member recesses, said outer clamp member having two pairs of opposed wings, each pair of wings defining a recess dimensioned to receive one of said two outwardly projecting angularly spaced shoulders; and
    a bolt insertable through said third opening and threadably engageable in said second threaded opening to clamp said outer clamp member to said clamp surface in a first clamping position with one of said two outwardly projecting angularly spaced shoulders received between each pair of wings,
    wherein said top surface faces axially opposite said cylindrical rim and connects the cylindrical rim to the first threaded opening.

2. The conduit cap of claim 1 wherein said outer clamp member is rotatable 90° and said bolt is insertable through said third opening and threadably engageable in said second threaded opening to clamp said outer clamp member to said clamp surface in a second clamping position.

3. The conduit cap of claim 1 wherein said clamp surface defines a pair of parallel clamp surface recesses, said second threaded opening between said pair of parallel clamp surface recesses.

4. The conduit cap of claim 3, wherein said pair of parallel clamp member recesses are parallel to and aligned with said pair of parallel clamp surface recesses when said outer clamp member is in the first clamping position.

5. The conduit cap of claim 1, wherein said pairs of wings are curved and each pair of wings at least partially define one of the clamp member recesses.

6. The conduit cap of claim 1 wherein a boss extends outwardly from said clamp surface and defines said second threaded bore and said boss is at least partially receivable in said third opening.

7. The conduit cap of claim 1 wherein said cap has an interior boss which defines said first threaded opening.

8. The conduit cap of claim 1 wherein said conduit cap is a metal cast member.

9. A conduit cap for closing an opening in an end of a cylindrical conduit, said conduit cap comprising:
    a cap body defining a cylindrical recess closed in first axial direction by a cap body top and open in a second axial direction opposite said first axial direction, said cap body top defining a first threaded bore concentric with and opening into said cylindrical recess, said cap body including a radially outward facing clamp surface defining a second threaded bore transverse to said first threaded bore;

an outer clamp member defining a third opening and a pair of clamp member recess open to end faces of the clamp member, said third opening between the pair of clamp member recesses; and a fastener insertable through said third opening and threadably engageable in the second threaded opening to clamp said outer clamp member to said clamp surface, wherein said outer clamp member can be clamped to said cap in a first clamped position with the pair of clamp member recesses aligned with an axis of said cylindrical recess or in a second clamped position with the pair of clamp member recesses perpendicular to the axis of said cylindrical recess.

10. The conduit cap of claim 1, wherein said clamp surface defines a pair of claim surface recesses, said pair of clamp surface recesses aligned with said pair of clamp member recesses when said outer clamp member is in said first clamped position.

11. The conduit cap of claim 1, wherein said outer clamp member includes barbs that project into the pair of clamp member recesses.

12. The conduit cap of claim 1, wherein said clamp surface includes two laterally spaced outwardly projecting shoulders, and said outer clamp member includes side edges interrupted by indentations configured to receive the shoulders when the outer clamp member is in the first clamped position.

13. The conduit cap of claim 12, wherein each of said outwardly projecting shoulders forms a portion of a laterally outward edge of one of the pair of clamp surface recesses.

14. The conduit cap of claim 1, wherein a boss extends outwardly from said clamp surface and defines the second threaded bore, said boss at least partially receivable in said third opening when the outer clamp member is in the first or second clamped position.

* * * * *